(12) United States Patent
Woods et al.

(10) Patent No.: US 9,873,497 B1
(45) Date of Patent: Jan. 23, 2018

(54) MARINE MUFFLER WITH INTEGRAL BYPASS WATER MANAGEMENT

(71) Applicants: Woodrow Woods, Riviera Beach, FL (US); Darrin Woods, Riviera Beach, FL (US)

(72) Inventors: Woodrow Woods, Riviera Beach, FL (US); Darrin Woods, Riviera Beach, FL (US)

( * ) Notice: Subject to any disclaimer, the term of this patent is extended or adjusted under 35 U.S.C. 154(b) by 0 days.

(21) Appl. No.: 15/381,184

(22) Filed: Dec. 16, 2016

Related U.S. Application Data

(60) Provisional application No. 62/268,755, filed on Dec. 17, 2015.

(51) Int. Cl.
*B63H 21/32* (2006.01)
*F01N 1/08* (2006.01)
*F01N 13/00* (2010.01)

(52) U.S. Cl.
CPC .............. *B63H 21/32* (2013.01); *F01N 1/083* (2013.01); *F01N 13/002* (2013.01)

(58) Field of Classification Search
CPC ............................ F01N 13/004; B63H 21/32
See application file for complete search history.

(56) References Cited

U.S. PATENT DOCUMENTS

| | | | | |
|---|---|---|---|---|
| 1,065,707 | A | * | 6/1913 | Montgomery .......... F01N 13/12 181/235 |
| 2,360,429 | A | * | 10/1944 | Leadbetter ................ F01N 3/04 181/260 |
| 4,918,917 | A | | 4/1990 | Woods |
| 5,196,655 | A | | 3/1993 | Woods |
| 5,228,876 | A | | 7/1993 | Woods |
| 5,262,600 | A | | 11/1993 | Woods |
| 5,444,196 | A | | 8/1995 | Woods |
| 5,504,280 | A | | 4/1996 | Woods |
| 5,616,893 | A | | 4/1997 | Woods |
| 5,625,173 | A | | 4/1997 | Woods |
| 5,718,462 | A | | 2/1998 | Woods |
| 5,740,670 | A | | 4/1998 | Woods |
| 6,564,901 | B2 | | 5/2003 | Woods |
| 7,581,620 | B2 | | 9/2009 | Woods |
| 7,905,322 | B2 | | 3/2011 | Woods |
| 7,942,238 | B2 | | 5/2011 | Woods |
| 8,246,403 | B2 | | 8/2012 | Woods |
| 8,651,907 | B2 | | 2/2014 | Woods |

\* cited by examiner

*Primary Examiner* — Edwin Swinehart
(74) *Attorney, Agent, or Firm* — Mark D. Bowen; Malin Haley DiMaggio & Bowen, P.A.

(57) ABSTRACT

A marine muffler capable of handling both marine engine exhaust gas and marine engine cooling water includes a double wall baffle partitioning the muffler interior so as to function as a cooling water conduit. The cooling water conduit includes an inlet disposed external to the main muffler housing and an outlet configured and disposed so as to discharge the engine cooling water into the exhaust duct connected to the muffler outlet. The muffler is thus able to convey the engine cooling water through the muffler housing within a dedicated conduit while maintaining the cooling water separate from the exhaust gas. A muffler that is adapted to handle both the exhaust and cooling water flowing from a marine engine allows for the elimination of engine cooling water piping.

4 Claims, 5 Drawing Sheets

MARINE MUFFLER WITH INTEGRAL BYPASS WATER MANAGEMENT

CROSS REFERENCE TO RELATED APPLICATIONS

This application claims the benefit of provisional U.S. Patent Application Ser. No. 62/268,755, filed Dec. 17, 2015.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to marine exhaust systems for use with internal combustion marine engines, and more particularly to an improved marine muffler adapted with bypass water management so as to allow 100% of engine cooling water to flow through the muffler, including water injected into and entrained by the exhaust stream for cooling the engine exhaust, as well as the remaining bypass cooling water flowing from the engine cooling system.

2. Description of Related Art

Marine vessels are typically configured with a propulsion system powered by an internal combustion engine mounted within the vessel hull. A marine engine typically draws in water from body of water upon which the vessel rides primarily to cool the engine. Once the water has cooled the engine a small portion thereof is typically sprayed into, and entrained by, the exhaust gas stream to aid in cooling exhaust gas. A portion of this water may flash to steam (or vapor) while some may continue to flow in a liquid state. Regardless of the state, the water injected into the exhaust gas stream is entrained and carried along through the exhaust system by the flowing exhaust gas. This entrained water is carried by the exhaust gas flow through the muffler and eventually discharged from the vessel along with the exhaust gas. The majority of the water used to cool the engine is not, however, injected to cool the exhaust gas, and is typically routed from the engine into a separate bypass piping system for discharge overboard. This so-called bypass water typically comprises approximately 70% of the total water discharged from the engine cooling system. As result, water pipes of significant size run from each engine through the engine room to transport the bypass cooling water from the engine to a discharge location, typically located at or near the transom. These bypass water piping systems are costly, take-up valuable space within the typically confined engine room, and add weight to the vessel.

Accordingly, there exists a need for an improved marine muffler capable of independently handling multiple streams of exhaust gas (with entrained exhaust cooling water) and engine cooling water so as to eliminate the need for expensive and space consuming engine cooling water piping systems.

BRIEF SUMMARY OF THE INVENTION

The present invention overcomes limitations present in the art by providing an improved muffler for marine engines having a housing defining an interior volume and including an exhaust inlet and outlet, and a baffle partitioning the interior volume into a lower chamber in communication with the exhaust inlet and an upper chamber in communication with the exhaust outlet. A significant aspect of the present invention involves providing a marine muffler that it is capable of handling 100% of the cooling water used by the marine engine, namely entrained exhaust gas cooling water as well as bypass cooling water. In accordance with this aspect, the baffle partitioning the interior volume is provided as a double walled structure defining an engine bypass water conduit. The bypass water conduit includes a bypass water inlet disposed in proximity to muffler exhaust gas inlet, and an outlet configured and disposed so as to discharge the bypass water into the exhaust pipe connected to the muffler exhaust outlet. The muffler is thus able to convey bypass water through the muffler housing within a dedicated conduit while maintaining the cooling water separate from the exhaust gas and entrained exhaust cooling water. By providing a muffler that is adapted to handle both the engine exhaust and cooling water flowing from a marine engine, the present invention eliminates a significant amount of otherwise required water bypass pipe, connections, hardware, etc.

Accordingly, it is an object of the present invention to provide an improved marine muffler.

Another object of the present invention is to provide a marine muffler adapted to handle engine bypass water so as to save space within an engine room by eliminating the need for separate dedicated bypass water piping systems.

Still another object of the present invention is to provide a marine muffler having a double walled baffle which functions as an engine cooling water conduit for routing engine cooling water through the muffler separated from the exhaust gas.

In accordance with these and other objects, which will become apparent hereinafter, the instant invention will now be described with particular reference to the accompanying drawings.

DETAILED DESCRIPTION OF THE INVENTION

Figure 1:
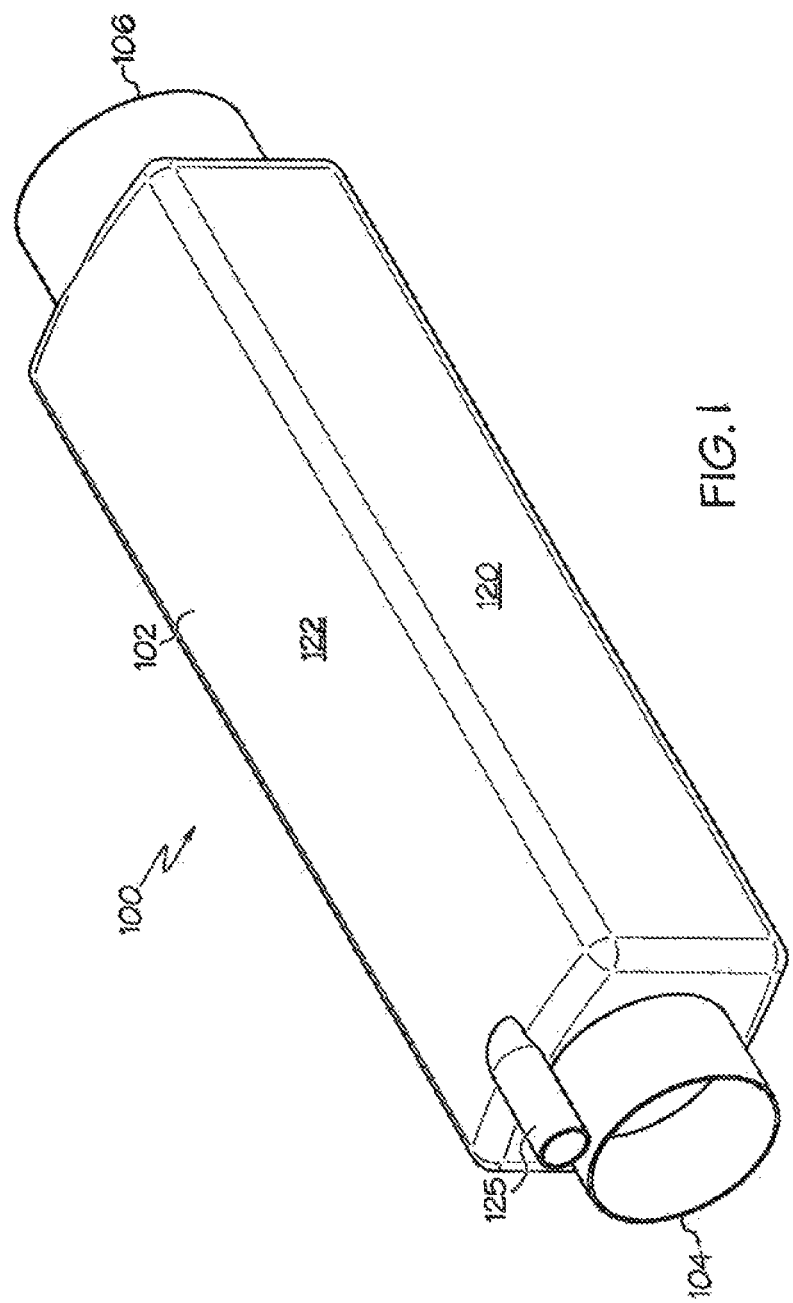
FIG. 1 is an inlet-end perspective view of a marine muffler adapted to handle engine exhaust gas and bypass water in accordance with an alternate embodiment of the present invention.

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

FIGS. 1-5 depict a marine muffler, generally referenced as 100, adapted with a conduit for routing bypass engine cooling water through the muffler separate from exhaust gases in accordance with the present invention. This concept is preferably embodied by adapting muffler 100 with a double walled baffle forming a cooling water duct or conduit for allowing engine bypass cooling water to pass completely through the muffler as more fully described below. The engine cooling water is routed to an outlet such that the cooling water and exhaust gas are both transported by the final run of exhaust pipe for discharge from the vessel. In contemplated alternate embodiments, the bypass water may be routed though the muffler housing by cylindrical pipes or any other suitable conduits. It is preferable, however, that any such bypass water conduits, ducts, pipes, or other bypass handing system further function to enhance structural stiffness.

Muffler 100 includes a housing 102 defining an internal volume. Housing 102 is preferably elongate, and is formed about a longitudinal axis. More particularly, the length of the housing (as measured from inlet to outlet) is preferably longer than the housing width (as measured from side-to-side) and housing height (as measured from top to bottom). The present invention is suitable for use with housings having various shapes and thus should not be construed as being limited to the housing configuration disclosed. Housing 102 has opposing ends forming a generally cylindrical inlet 104 and a generally cylindrical outlet 106. Inlet 104 may be larger in diameter (e.g. larger cross-sectional area) than outlet 106 so as to cause exhaust gas flowing therethrough to accelerate such that exhaust gas exits outlet 106 with a greater velocity than the velocity if measured at inlet 104, however, the relative dimensions (i.e. area) of inlet 104 and outlet 106 may vary and any suitable dimensions are considered within the scope of the present invention. Housing 102 is preferably fabricated from temperature resistant fiberglass, however, any suitable material is considered within the scope of the present invention. Housing 102 preferably includes generally planar opposing side walls, each referenced as 120, a top 122 and a bottom 123. Housing 102 preferably comprises a generally rectangular cross-section, however, housing 102 may be cylindrical or any other geometric shape. In addition, top 122 and bottom 123 may define arcuate interior surfaces which may be either convex or concave when viewed from the interior of housing 102, to provide increased stiffness.

Figure 2:
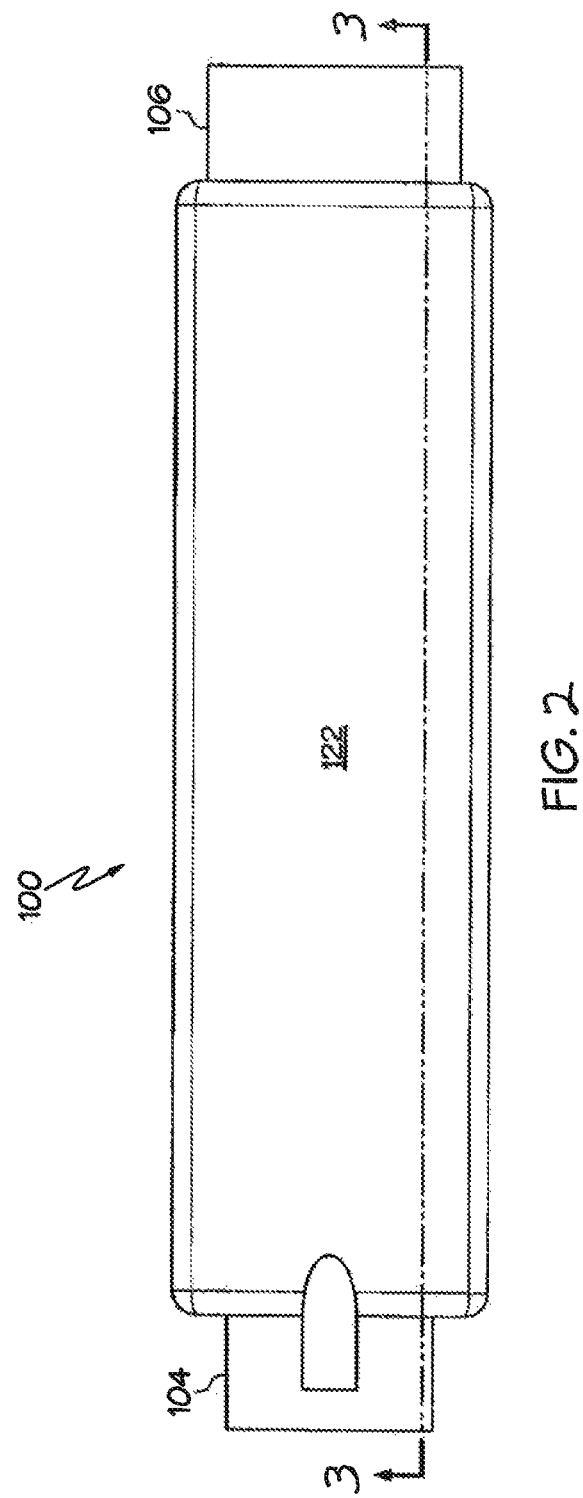
FIG. 2 is a top plan view thereof.
Figure 3:
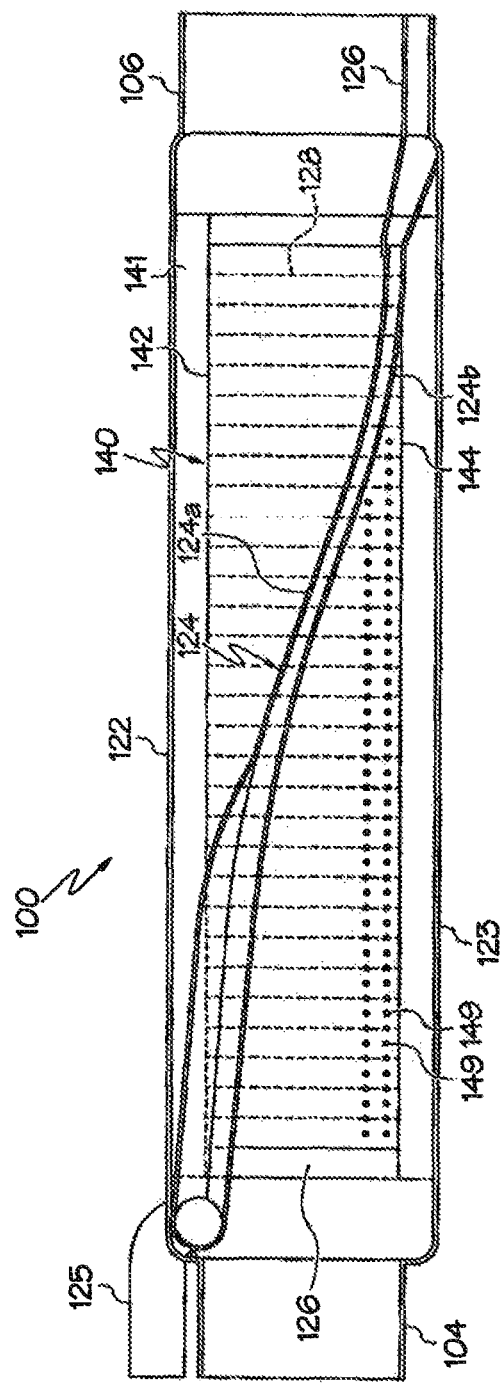
FIG. 3 is a side sectional view taken along line 3-3 of FIG. 2.

Muffler housing 102 defines an internal volume and includes an angularly disposed/inclined double-wall baffle, generally referenced as 124, having peripheral edges in sealing engagement with inner surface of side walls 12—so as to divide the internal volume into a lower/inlet chamber 126 (e.g. the volume disposed below the baffle) and an upper/outlet chamber 128 (e.g. the volume disposed above the baffle). In a preferred embodiment baffle 124 is curved as illustrated in FIG. 3, however any planar or non-planar geometry or slope configuration is considered within the scope of the present invention. As noted above, baffle 124 comprises a double wall baffle including an upper baffle wall 124a and a lower baffle wall 124b and thus functions as a duct or conduit to allow engine cooling water to flow through the muffler. Engine cooling water is fed into baffle 124, proximal in the inlet end of the muffler, by a bypass water inlet 125 which is in fluid communication with bypass cooling water discharged from the marine engine. Bypass water inlet 125 may be centrally positioned as seen in FIGS. 1 and 2, or disposed in any suitable location including, lower central, upper left or upper right sides, or lower left or lower right sides of the housing, or any other suitable location. Water flowing through baffle 124 exits the muffler via outlet 106 as seen in FIG. 3. A deflector plate 126, shown in FIG. 3, may be fitted at the outlet end of baffle 124 to guide the engine cooling water along the lower portion of muffler outlet 106 such that the water does not restrict exhaust flowing through outlet 106. Engine bypass cooling water as well as the exhaust exiting muffler 100 is routed for discharge from the vessel by the exhaust pipe (not shown) normally connected to the outlet of the muffler. While the embodiment disclosed in FIGS. 1-5 discloses a double wall baffle forming an engine water duct, the present invention may incorporate alternate engine water duct/conduit configurations, such as conventional piping which is contained within the housing interior either internal with or external to the baffle structure so as to achieve a significant aspect of the present invention, namely, providing a marine muffler capable of handling both exhaust gas (with entrained exhaust cooling water) as well as engine bypass cooling water.

A number of advantages are realized by adapting muffler 100 to handle not only exhaust gas (with some entrained exhaust cooling water) but also the balance of the engine cooling water (i.e. bypass water), which comprises the vast majority of cooling water used by the engine. First, adapting the baffle to a double wall structure containing water improves exhaust silencing performance by providing improved vibration dampening. Accordingly, exhaust pulsations are dampened resulting quieter exhaust discharge sound. Second, using the muffler and downstream exhaust pipe to handle both exhaust gas (with entrained cooling water) as well as the engine bypass cooling water eliminates the need for a dedicated engine cooling water pipe system running from the engine to the transom. Elimination of these components saves costs, weight, and increases available space within the vessel.

In the embodiment depicted in FIGS. 1-5, baffle 124 is slopes downward from the inlet end to the outlet end in a curved manner. Baffle 124 may, however, traverse the interior of muffler 100, in any suitable shape or geometric configuration. For example, baffle 124 may be concave or convex (about either a longitudinal axis or alternatively a transverse axis when viewed from above), or any other shape provided the interior of the muffler is divided into a lower inlet chamber and an upper outlet chamber. Further, as should be apparent, the angle of inclination will vary depending on the dimensions of the muffler housing, however, in the preferred embodiment the angle of inclination is dictated by the length and height of the housing as the baffle preferably divides the housing interior into roughly equal upper and lower chambers. As should be apparent, the exact terminus of baffle 124 is not considered particularly important so long as the interior of housing 102 is divided into a lower chamber at the inlet end and an upper chamber at the outlet end. While baffle 124 is preferably disposed so as to define upper and lower chambers of generally equal volumes, the baffle may be configured to form chambers of different sizes and/or dimensions in accordance with the present invention.

Figure 4:
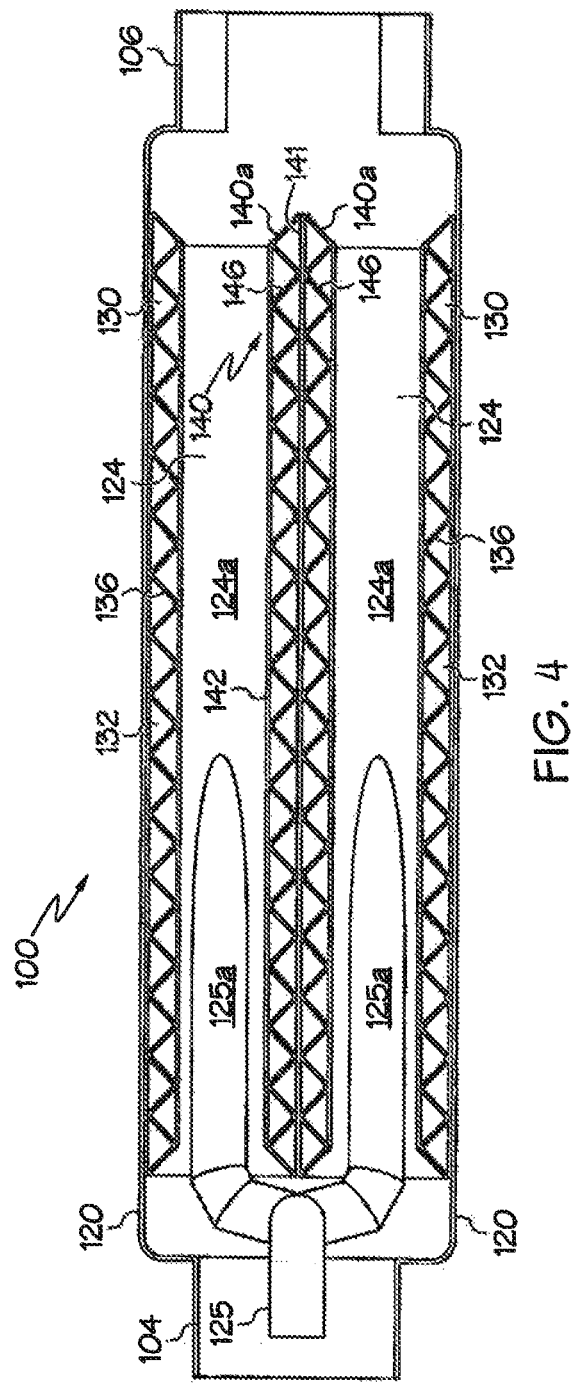
FIG. 4 is a top plan view of the muffler shown in FIG. 2 with the top removed to illustrate internal structure.
Figure 5:
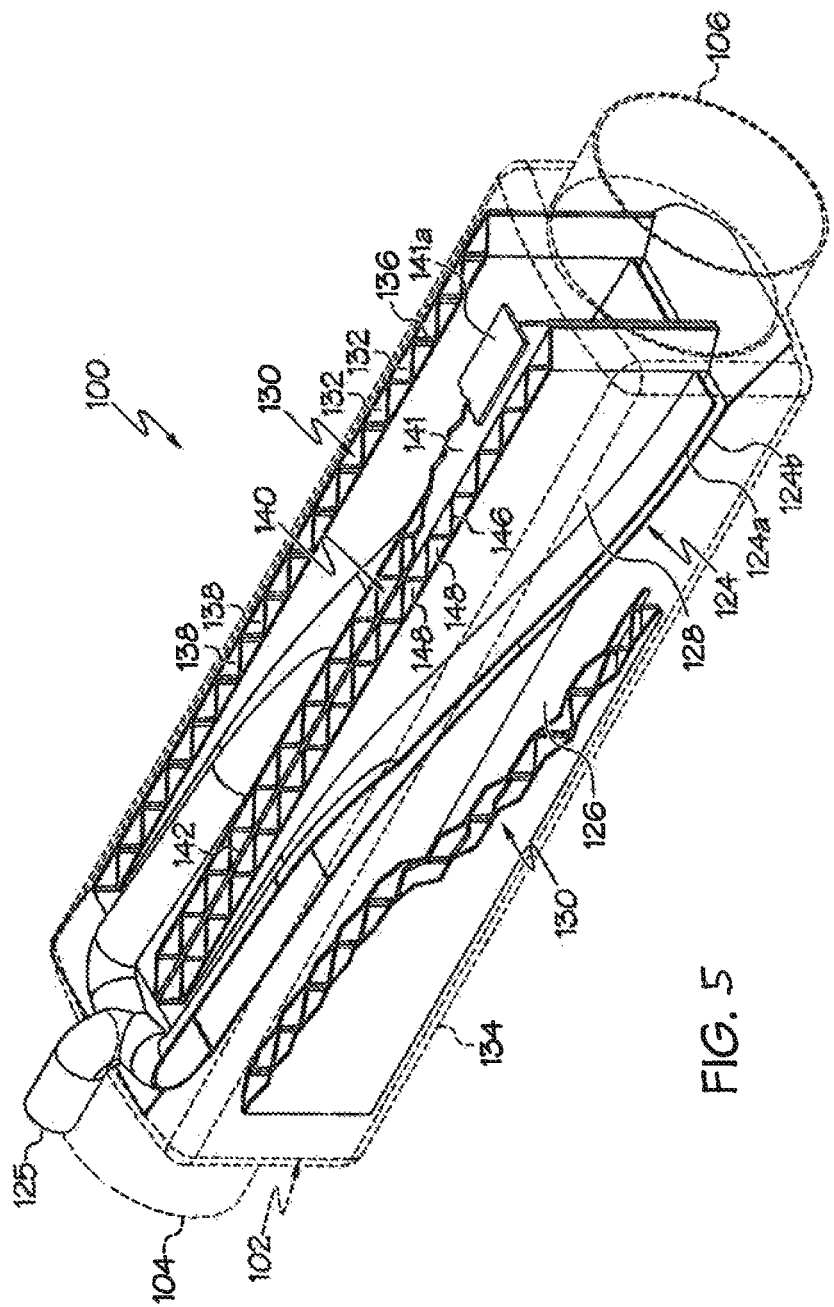
FIG. 5 is an outlet-end perspective view in partial cutaway, with the housing shown in phantom to illustrate internal structure.

As best shown in FIGS. 3-5, housing 102 incorporates a plurality of internal exhaust ducts, generally referenced as 130 and 140. Exhaust ducts 130 and 140 extend through baffle 124 so as to place lower muffler chamber 126 in fluid communication with the upper muffler chamber 128, thereby providing flow paths for exhaust between the lower and upper chambers such that exhaust gas entering inlet 104 can exit outlet 106.

Exhaust ducts 130 are disposed adjacent to and preferably attached directly to the inner surface of a corresponding opposing side wall 120. As best seen in FIG. 4, exhaust duct 140 defines a generally longitudinally disposed vertical structure within muffler housing 102. Exhaust duct 140 includes a partition wall 141 extending between the top 122 and bottom 123 of muffler housing 102. Partition wall 141 is preferably attached to the top 122 and bottom 123 of muffler housing 102 by a flange portion 141*a* so as to stiffen the top and bottom panels. Partition wall 141 divides duct 140 into adjacently disposed ducts, each referenced 140*a*. As best illustrated in FIG. 4, partition wall 141 and ducts 140*a* divide baffle 124 into longitudinally projecting halves. Accordingly, bypass water inlet 125 divides into corresponding branches, referenced as 125*a*, which are in fluid communication with the respective left and right conduits formed between the upper and lower baffle panels 124*a* and 124*b* so as to equally supply engine cooling water to each conduit.

Each exhaust ducts 130 and 140 each define an open bottom end, referenced as 132 and 142 respectively, and an open top end, referenced as 134 and 144. Exhaust ducts 130 and 140 are generally vertically disposed and penetrate baffle 124 thereby placing the upper and lower chambers, 126 and 128, in fluid communication. Each exhaust duct 130 and 140 preferably includes a corrugated partition, referenced as 136 and 146, that divides the exhaust duct into a plurality of non-circular exhaust conduits referenced as 138 and 148 respectively. The exhaust ducts 130 further function to stiffen the generally planar housing side walls 120, thereby reducing the tendency of non-reinforced side walls to vibrate in response to exhaust gas pulsation. Further exhaust duct 140 and partition wall 141 function to reinforce the baffle structure as well as the housing top 122 and bottom 123 walls. This reduction in housing wall vibration results in a quieter muffler by reducing the transmission of vibration related noise external to housing 102.

As noted above, ducts 130 and 140 are have open top and bottom ends which are disposed in spaced relation with the interior housing top and bottom surfaces so as to provide clearance for exhaust gas and entrained exhaust gas cooling water to flow through the ducts from the lower inlet chamber 126 to the upper outlet chamber 128. The present invention further contemplates selective modifications to muffler 100 to maximize performance. In this regard ducts 130 and/or 140 may be adapted with apertures disposed in the lower duct wall. FIG. 3 illustrates apertures, referenced as 149, formed in the lower duct wall of duct 140. In addition, muffler 100 may be further adapted to maximize performance by selectively capping one or more of the non-circular duct conduits 132 and/or 142.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A marine muffler comprising:
   a housing defining an interior volume;
   said housing including a first end forming an exhaust inlet, and an opposing second end forming an exhaust outlet;
   a baffle disposed within said housing, said baffle dividing said internal volume into a lower inlet chamber and an upper outlet chamber;
   at least one exhaust duct disposed within said interior volume, said exhaust duct extending through said baffle, said exhaust duct having an open bottom end in fluid communication with said inlet chamber and an open top end in fluid communication with said outlet chamber; and
   a bypass water conduit having a bypass water inlet disposed external to said housing, and a bypass water outlet disposed to discharge bypass water through said exhaust outlet.

2. The marine muffler according to claim 1, wherein said bypass water conduit is integrated with said baffle.

3. The marine muffler according to claim 1 wherein said baffle comprises a double wall baffle having an upper wall in spaced relation with a lower wall, whereby a bypass water conduit is formed between said upper and lower baffle walls.

4. A marine muffler comprising:
   a generally hollow muffler housing defining an interior volume, said housing including opposing side walls, a top and a bottom;
   said housing including a first end forming an exhaust inlet, and an opposing second end forming an exhaust outlet;
   a baffle disposed within said housing, said baffle having a peripheral edge in sealing engagement with internal housing structure such that said baffle divides said internal volume into a lower inlet chamber and an upper outlet chamber,
   said baffle defining a double wall baffle having spaced upper and lower baffle walls forming a bypass water conduit;
   a bypass water inlet in fluid communication with said bypass water conduit;
   at least one exhaust duct disposed within said interior volume, said exhaust duct extending through said baffle and terminating in an open bottom end in fluid communication with said inlet chamber and an open top end in fluid communication with said outlet chamber, and
   said baffle including an engine cooling water conduit having a cooling water inlet disposed external to said housing, and a cooling water outlet disposed within said interior volume proximal said exhaust outlet.

\* \* \* \* \*